(No Model.)

C. M. RICHMOND.
ARTIFICIAL DENTURE.

No. 277,941. Patented May 22, 1883.

Witnesses:
Geo. H. Evans
A. Gref

Inventor:
Cassius M. Richmond
By his Attorney
E. N. Dickerson Jr.

UNITED STATES PATENT OFFICE.

CASSIUS M. RICHMOND, OF NEW YORK, N. Y., ASSIGNOR TO THE RICHMOND TOOTH CROWN COMPANY, OF SAME PLACE.

ARTIFICIAL DENTURE.

SPECIFICATION forming part of Letters Patent No. 277,941, dated May 22, 1883.

Application filed December 1, 1882. (No model.)

*To all whom it may concern:*

Be it known that I, CASSIUS M. RICHMOND, of the city, county, and State of New York, have invented a new and useful Improvement in Artificial Dentures, of which the following is a full, true, and exact description, reference being had to the accompanying drawings.

My invention relates to an improved process of preparing artificial dentures, and to an improved tooth-crown which may be prepared by said process.

I have previously patented, on the 10th day of February, 1880, a tooth-crown. The present invention consists in an improvement upon the tooth-crown therein described, being simpler in construction and more permanent when finished.

In my drawings similar letters refer to similar parts.

Figure 1:
Figure 3:
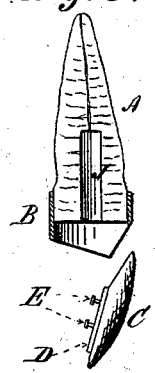
Figure 2:
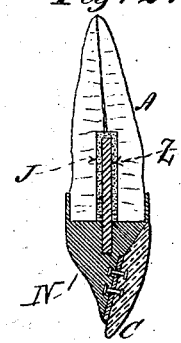
Figure 5:
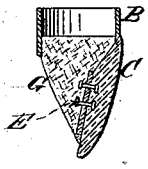
Figure 4:
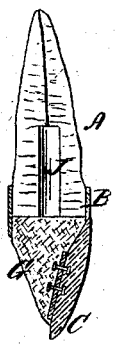
Figure 7:
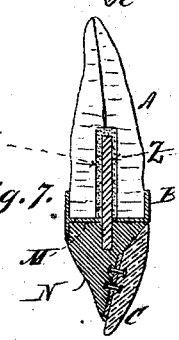
Figure 6:
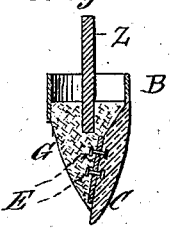
Figure 8:
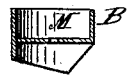

Figure 1 represents a view of the root with the tooth-crown applied; Fig. 2, a sectional view of the same; Fig. 3, a section of the prepared root with the ferrule in situation; Fig. 4, a view of the prepared root with the crown in situation, being there held by wax; Fig. 5, a view of the incomplete crown shown in Fig. 4 when removed from the tooth; Fig. 6, a view of the same with the attaching-pin in position ready to be invested. Figs. 7 and 8 represent views of a modified ferrule.

A represents the root. In practice a hole, J, is drilled in the same, as shown. The end of the tooth being then properly prepared, a ferrule, B, is made of such a size as to exactly fit the base of the root. This ferrule is shown in position in Fig. 3. A suitable crown, C, is then selected to be applied to the root. Of course color, size, and shape should be consulted in this selection. Upon the back of this crown is placed a protecting platinum or gold plate, D, which has holes through it to allow of the passage of the pins E, which are firmly embedded in the porcelain in the well-known manner. The root and crown having been so prepared, the crown is placed in position and attached to the ferrule by wax G, as shown in Fig. 4. This wax will hold the crown sufficiently firmly in position to allow of the removal of the ferrule B. In Fig. 5 the ferrule B and the crown attached thereto by wax are clearly shown. Thereafter a suitable pin, Z, is embedded in the wax, as shown in Fig. 6. This pin is designed to enter the hole J, drilled in the root. The prepared crown shown in Fig. 6 is then invested or protected by a suitable covering of marble-dust and plaster, leaving the wax portion G exposed. This investiture will hold the parts firmly in the position which they are to occupy when placed in the mouth. The wax may then be readily melted from behind the crown and replaced by a suitable gold solder, which may be blown in by a blow-pipe and fused around the pin. This solder will unite with the pin, the ferrule B, the plate D, and pin Z, making a solid metal backing, N, to the crown C, and firmly holding all the parts together. The prepared crown is then slipped upon the prepared root, as shown in Fig. 2, and cemented thereto. The said ferrule, when in position, should project under the free margin of the gum sufficiently to protect the root from decay. That part of said ferrule is likewise concealed from view by the gum. The cement surrounding the pin Z is shown at J.

In Fig. 7 is shown a ferrule in position similar to the one shown in Fig. 2, the difference being that in this case the ferrule is made in the form of a cup surrounding the end of the root, with a hole pierced therethrough. In Fig. 8 the separate ferrule is shown. The method of attaching is the same.

I do not limit myself to a crown prepared by the exact process here described, as said crown might be prepared in other ways; but I prefer the process here described.

It will be seen that when this denture is applied to a root the end of the root is entirely protected from the injurious action of the fluids of the mouth, and is hermetically sealed, being covered by a closed cap. This inclosing-cap is of the greatest importance, because otherwise decay must necessarily take place by reason of the action of the fluids of the mouth on the exposed dentine, and the denture would become useless. By this arrangement, therefore, both the end of the root and so much of the same as might otherwise be exposed to the fluids of the mouth are hermetically sealed, and the root is thus protected from the injurious effect which would otherwise result from the action of the fluids. It is obvious, likewise, that by this arrangement the end of the root may retain its natural configuration, and its substance is not destroyed by cutting away or shaping the same at the sides, which is very injurious and tends greatly to the destruction of the root. It is obvious that this part of my invention—namely, the sealing-cap on the end of the root—may be used with other kinds of dentures and other arrangements of artificial crowns besides those shown herein, and that, when properly applied, the root is completely protected. As shown in Figs. 2, 4, and 7, the flange of the cap should project beneath the gum and allow the gum to extend to the porcelain crown. The freedom of the gum from permanent attachment with the end of the root allows this band to be placed in position without causing irritation. I do not limit myself to the precise method of attaching this inclosing-cap to the root, as other methods might be employed; but the one here shown is the simplest known to me.

The caps hereinbefore described are so constructed, as set forth, as to cover and inclose the prepared end of the root, wholly excluding the juices of the mouth therefrom, and preventing the decay that would otherwise result.

What I claim as my invention, and desire to secure by Letters Patent, is—

1. The combination of a prepared root, having its natural terminal contour near the margin of the gum, with an inclosing-cap attached thereto for supporting an artificial denture, substantially as described.

2. The combination of a prepared root, having its natural terminal contour near the margin of the gum, with an inclosing-cap attached thereto, and with an artificial porcelain or other crown supported by said cap, substantially as described.

3. The combination of a prepared root, having its natural terminal contour near the margin of the gum, with an inclosing-cap attached thereto, the said cap being attached to the root by a pin or suitable attaching contrivance passing upward and into a suitable cavity in the root, substantially as described.

4. The combination of a tooth-crown, a metallic backing soldered to said crown, and a pin firmly soldered to said artificial backing and secured to and passing through a ferrule adapted to surround the root, substantially as described.

5. The combination of the crown C, provided with suitable attaching-pins, E, the backing-plate D, and the metallic backing N, united to ferrule B and pin Z, substantially as described.

6. The combination of the crown C, metallic backing N, united to protecting-plate D and pin Z, the root A, and cement J, uniting the pin Z to the root, substantially as described.

CASSIUS M. RICHMOND.

Witnesses:
GEO. H. EVANS,
WM. A. POLLOCK.